US00RE49838E

(19) United States
(12) Reissued Patent
Nakakuki et al.

(10) Patent Number: US RE49,838 E
(45) Date of Reissued Patent: Feb. 13, 2024

(54) NOTIFICATION DEVICE AND VEHICLE USING SAME

(71) Applicant: Panasonic Intellectual Property Management Co., Ltd., Osaka (JP)

(72) Inventors: Toshio Nakakuki, Gifu (JP); Takao Mizuguchi, Aichi (JP)

(73) Assignee: PANASONIC INTELLECTUAL PROPERTY MANAGEMENT CO., LTD., Osaka (JP)

(21) Appl. No.: 17/563,558

(22) Filed: Dec. 28, 2021

Related U.S. Patent Documents

Reissue of:
(64) Patent No.: 9,620,012
Issued: Apr. 11, 2017
Appl. No.: 14/616,430
Filed: Feb. 6, 2015

U.S. Applications:
(63) Continuation of application No. 16/206,836, filed on Nov. 30, 2018, now Pat. No. Re. 48,926, which is a
(Continued)

(30) Foreign Application Priority Data

Sep. 28, 2012 (JP) ..... 2021-217887

(51) Int. Cl.
*G08G 1/09* (2006.01)
*G08G 1/16* (2006.01)
(Continued)

(52) U.S. Cl.
CPC ..... *G08G 1/09* (2013.01); *G08G 1/095* (2013.01); *G08G 1/096* (2013.01);
(Continued)

(58) Field of Classification Search
CPC .. G08G 1/095; G08G 1/096716; G08G 1/161; G08G 1/166; G08G 1/096;
(Continued)

(56) References Cited

U.S. PATENT DOCUMENTS 5,656,992 A 8/1997 McNeill
5,808,728 A 9/1998 Uehara
(Continued)

FOREIGN PATENT DOCUMENTS

DE 102008035992 A1 3/2009
EP 2280386 A1 2/2011
(Continued)

OTHER PUBLICATIONS

Non-Final Office Action issued in corresponding U.S. Appl. No. 16/204,958, dated May 18, 2020.
(Continued)

*Primary Examiner* — C. Michelle Tarae
(74) *Attorney, Agent, or Firm* — Rimon, P.C.

(57) ABSTRACT

An application processing unit executes an application that is perforated as a notification device mounted in a vehicle. In the application processing unit, an input unit acquires information indicating that the vehicle is receiving driving assistance. In the application processing unit, an output unit outputs notifications to other vehicles in accordance with the information that has been acquired at the input unit.

8 Claims, 13 Drawing Sheets

Related U.S. Application Data continuation of application No. 16/204,958, filed on Nov. 29, 2018, now Pat. No. Re. 48,747, which is an application for the reissue of Pat. No. 9,620,012, filed as application No. PCT/JP2013/005349 on Sep. 10, 2013.

(51) Int. Cl.
*G08G 1/095* (2006.01)
*G08G 1/096* (2006.01)
*G08G 1/0967* (2006.01)

(52) U.S. Cl.
CPC . *G08G 1/096716* (2013.01); *G08G 1/096725* (2013.01); *G08G 1/161* (2013.01); *G08G 1/166* (2013.01); *G08G 1/0967* (2013.01); *G08G 1/16* (2013.01)

(58) Field of Classification Search
CPC .. G08G 1/09; G08G 1/096725; G08G 1/0967; G08G 1/16
See application file for complete search history.

(56) References Cited

U.S. PATENT DOCUMENTS 5,835,008 A 11/1998 Colemere, Jr.
6,243,685 B1 6/2001 Welch et al.
6,262,657 B1 7/2001 Okuda et al.
6,300,870 B1 10/2001 Nelson
6,335,681 B1 1/2002 Ontiveros et al.
6,411,891 B1 6/2002 Jones
6,624,782 B2 9/2003 Jocoy et al.
7,042,345 B2 5/2006 Ellis
7,133,767 B2 * 11/2006 Ogino ..... G01C 21/3697 701/400
7,190,260 B2 3/2007 Rast
7,209,050 B2 4/2007 Corcoran, III
7,295,925 B2 11/2007 Breed et al.
7,400,237 B2 7/2008 Cheng et al.
7,418,346 B2 8/2008 Breed et al.
7,426,437 B2 9/2008 Breed et al.
7,663,505 B2 2/2010 Publicover
7,796,081 B2 * 9/2010 Breed ..... G01S 17/86 342/72
7,894,988 B2 * 2/2011 Kimura ..... B60W 40/02 701/301
7,979,172 B2 * 7/2011 Breed ..... G08G 1/161 701/23
8,009,030 B2 8/2011 Van Neste
8,126,642 B2 * 2/2012 Trepagnier ..... G05D 1/0214 701/28
8,258,981 B2 9/2012 Turnbull
8,260,538 B2 9/2012 Noda et al.
8,311,730 B2 * 11/2012 Neff ..... B60W 40/02 701/1
8,352,111 B2 1/2013 Mudalige
8,352,112 B2 1/2013 Mudalige
8,452,509 B2 * 5/2013 Sujan ..... G01C 21/3469 475/5
8,554,468 B1 10/2013 Bullock
8,560,609 B2 10/2013 Nathanson
8,630,795 B2 * 1/2014 Breed ..... G01C 21/3697 701/1
8,699,754 B2 4/2014 Zhang et al.
8,874,305 B2 * 10/2014 Dolgov ..... G05D 1/0212 701/28
8,884,781 B2 11/2014 Yuse et al.
8,903,617 B2 12/2014 Braunberger et al.
8,907,814 B2 12/2014 Chen
8,917,189 B2 * 12/2014 Mukaiyama ..... G08G 1/09623 340/905
8,935,034 B1 1/2015 Zhu et al.
8,998,617 B2 * 4/2015 Kumar ..... B61C 17/12 434/66
9,037,852 B2 * 5/2015 Pinkus ..... G07B 13/00 713/168
9,050,930 B2 6/2015 Walsh et al.
9,108,570 B2 8/2015 Giangrande
9,365,162 B2 6/2016 Nix
9,633,562 B2 4/2017 Nathanson
9,922,557 B2 3/2018 Nathanson
2002/0105423 A1 8/2002 Rast
2003/0191568 A1 10/2003 Breed
2008/0312834 A1 12/2008 Noda et al.
2010/0284382 A1 11/2010 Stahlin et al.
2011/0130964 A1 * 6/2011 Kitagawa ..... G01C 21/3697 701/301
2011/0260886 A1 10/2011 Nagura et al.
2012/0239286 A1 9/2012 Mizuguchi
2012/0310465 A1 * 12/2012 Boatright ..... G01C 21/3661 701/25
2013/0076538 A1 * 3/2013 Uno ..... G08G 1/096716 340/905
2013/0110371 A1 * 5/2013 Ogawa ..... G08G 1/095 701/70
2015/0029039 A1 * 1/2015 Mukaiyama ..... G08G 1/096716 340/905

FOREIGN PATENT DOCUMENTS

JP 09-277887 A 10/1997
JP 11-053689 A 2/1999
JP 11-321380 A 11/1999
JP 2000-067371 A 3/2000
JP 2001-219760 A 8/2001
JP 2003-157482 A 5/2003
JP 2003-196800 A 7/2003
JP 2006-151114 A 6/2006
JP 2008-003959 A 1/2008
JP 2009-176172 A 8/2009
JP 2010-176632 A 8/2010
JP 2010-250442 A 11/2010
JP 2011-189776 A 9/2011
JP 2011-227761 A 11/2011
JP 2012-003352 A 1/2012
JP 2012-048489 A 3/2012
JP 2012-048655 A 3/2012
JP 2012-048748 A 3/2012
JP 2012-160126 A 8/2012

OTHER PUBLICATIONS

Japanese Office Action issued in corresponding Japanese Patent Application No. 2018-061367, dated Oct. 27, 2020, with English translation.
U.S. PTO Notice of Allowance issued in corresponding U.S. Appl. No. 16/204,958, dated Sep. 24, 2020.
U.S. PTO Notice of Allowance issued in U.S. Appl. No. 16/204,958, dated Dec. 10, 2020.
Extended European Search Report issued in European Application No. 13 84 2558.2 dated Jun. 15, 2015.
Entire Prosecution of U.S. Appl. No. 14/616,430, filed Feb. 6, 2015, now U.S. Pat. No. 9,620,012, issued Jun. 4, 2015 to Panasonic Intellectual Property Management Co., Ltd. entitled "Notification Device and Vehicle Using Same".
Entire Prosecution of U.S. Appl. No. 16/204,958, filed Nov. 29, 2018, issued Jun. 4, 2015 to Panasonic Intellectual Property Management Co., Ltd. entitled "Notification Device and Vehicle Using Same".
U.S. PTO Non-Final Office Action issued in related parent U.S. Appl. No. 16/206,836, dated Jul. 7, 2020.
U.S. PTO Final Office Action issued in related parent U.S. Appl. No. 16/206,836, dated Dec. 8, 2020.
U.S. PTO Non-Final Office Action issued in related parent U.S. Appl. No. 16/206,836, dated Jun. 7, 2021.
U.S. PTO Notice of Allowance issued in related parent U.S. Appl. No. 16/206,836, dated Sep. 28, 2021.

(56) References Cited

OTHER PUBLICATIONS

U.S. Appl. No. 16/206,836, filed Nov. 30, 2018.
Extended European Search Report issued in European Application No. 13 84 2553.2 dated Jun. 12, 2015.
International Search Report issued in International Application No. PCT/JP2013/005349 dated Oct. 8, 2013, with English translation.

* cited by examiner

NOTIFICATION DEVICE AND VEHICLE USING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

*Notice: More than one reissue application has been filed for the reissue of U.S. Pat. No. 9,620,012. The reissue applications are application Ser. Nos. 17/563,558 (the present application), 16/206,836, and 16/204,958, all of which are continuation reissues of U.S. Pat. No. 9,620,012.*

This application *is a reissue application of U.S. Pat. No. 9,620,012 issued on Apr. 11, 2017 from U.S. patent application Ser. No. 14/616,430 filed Feb. 6, 2015, and is a continuation of U.S. patent application Ser. No. 16/206,836 filed on Nov. 30, 2018, now Reissue U.S. Pat. No. RE48,926, issued on Feb. 8, 2022, which is a continuation of U.S. patent application Ser. No. 16/204,958 filed on Nov. 29, 2018, now Reissue U.S. Pat. No. RE48,747, issued on Sep. 21, 2011, which is also a reissue application of U.S. Pat. No. 9,620,012 issued on Apr. 11, 2017 from U.S. patent application Ser. No. 14/616,430 filed Feb. 6, 2015, which* is a continuation of International Application No. PCT/JP2013/005349, filed on Sep. 10, 2013, which in turn claims the benefit of Japanese Application No. 2012-217887 filed on Sep. 28, 2012, the disclosures of which are incorporated by reference herein.

BACKGROUND

1. Field

The present invention relates to a technology of notification and, more particularly, to a notification device that outputs notification in accordance with predetermined information and vehicles in which the notification device is used.

2. Description of the Related Art

There are proposed driving assistance systems capable of automatically outputting an alert for avoiding danger to the driver driving a vehicle in order to prevent the vehicle from getting into a dangerous running condition. In such systems, the running condition of the driver's vehicle or the presence of an obstacle in front is detected to determine whether to output an alert.

SUMMARY

In the presence of a vehicle receiving driving assistance such as green wave, drivers of nearby vehicles seeing the supported vehicle may not be able to understand the behavior such as acceleration or deceleration and cause a near-end accident, the drivers may feel offended and drive the vehicle dangerously (e.g., drive the vehicle in an inciting manner).

Embodiments address these issues and a purpose thereof is to provide a technology that helps prevent an accident induced by a vehicle receiving driving assistance.

The notification device according to an embodiment is mounted on a vehicle and includes: an acquisition unit that acquires information indicating that a driver's vehicle is receiving driving assistance in which a speed is controlled to allow the driver's vehicle to pass a signal with a traffic light of the signal turned green; an output unit that outputs notification to other vehicles in accordance with the information acquired by the acquisition unit; and a radio unit that transmits a packet signal including the notification output from the output unit.

Optional combinations of the aforementioned constituting elements, and implementations of the invention in the form of methods, apparatuses, systems, recording mediums, and computer programs may also be practiced as additional modes of the present invention.

DETAILED DESCRIPTION

Figure 1:
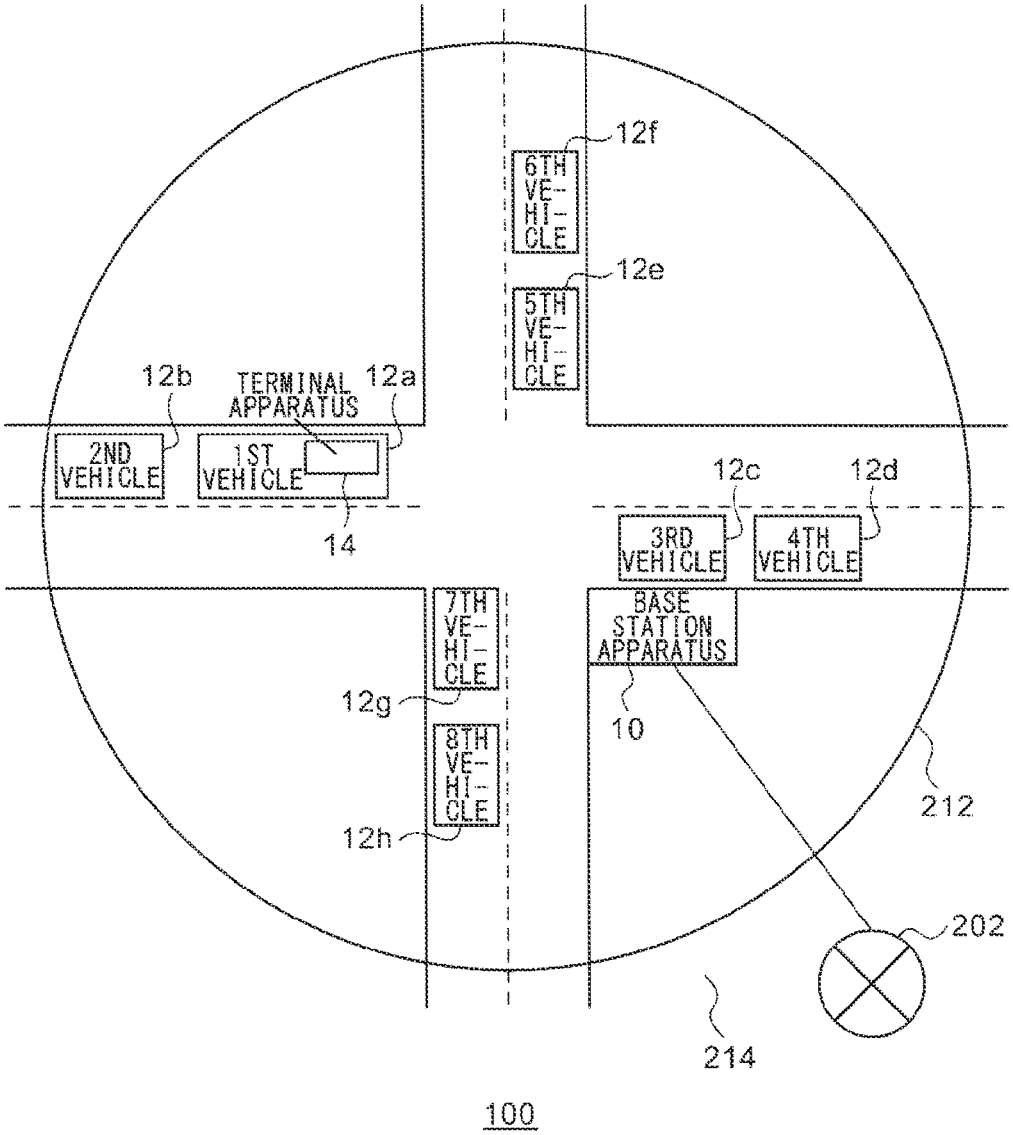
FIG. 1 shows the structure of a communication system according to the first embodiment.

The invention will now be described by reference to the preferred embodiments. This does not intend to limit the scope of the present invention, but to exemplify the invention.

First Embodiment

The knowledge that provides the basis of the technology will be discussed before discussing the first embodiment in specific details. The first embodiment relates to a communication system that performs inter-vehicle communication between terminal apparatuses mounted in vehicles and also performs road-to-vehicle communication from a base station apparatus placed at a traffic intersection or the like to a terminal apparatus. Such a system is referred to as an Intelligent Transport System (ITS). ITS is defined by the standard for 700 Hz band intelligent transport systems (Association of Radio Industries and Businesses).

The communication system uses access control called Carrier Sense Multiple Access with Collision Avoidance (CSMA/CA) along with wireless local area network (LAN) that complies with a standard such as IEEE802.11. For this reason, a given radio channel is shared by a plurality of terminal apparatuses. Meanwhile, information in ITS needs to be transmitted to an unspecified number of terminal apparatuses. To transmit information efficiently, the communication system broadcasts a packet signal.

In other words, a terminal apparatus broadcasts a packet signal containing information such as vehicle speed or position for inter-vehicle communication. Other terminal apparatuses receive the packet signal and acknowledge, for example, that the broadcasting vehicle is approaching based on the information. The base station apparatus repeatedly defines a frame containing a plurality of subframes in order to reduce interference between road-to-vehicle communication and inter-vehicle communication. For road-to-vehicle communication, the base station apparatus selects one of the plurality of subframes and broadcasts a packet signal containing control information, etc. in a period at the start of the selected subframe.

The control information includes information related to a period in which the base station apparatus broadcasts a packet signal (hereinafter, referred to as "road-to-vehicle transmission period"). The terminal apparatus identifies the road-to-vehicle period based on the control information and broadcasts a packet signal using CSMA in a period other than the road-to-vehicle period (hereinafter, referred to as "inter-vehicle transmission period"). As a result, road-to-vehicle communication and inter-vehicle communication are time-division multiplexed. Terminal apparatuses that cannot receive the control information from the base station apparatus, i.e., terminal apparatuses located outside an area formed by the base station apparatus, transmit a packet signal using CSMA irrespective of the frame structure.

A description will be given of an outline of the embodiments. When a vehicle decelerates or stops before a red light and then restarts, a large amount of energy is lost. GW driving is proposed in order to reduce energy loss. GW driving is a form of driving designed to achieve smooth traffic flow by controlling the speed of a vehicle so that the vehicle can pass a green light. In GW driving, the vehicle and the infrastructure are coordinated to present the driver with a method of driving capable of reducing energy loss. For example, a packet signal broadcast from a base station apparatus contains traffic signal information. The traffic signal information indicates the timing of a red light or the timing of a green light. The terminal apparatus mounted in the vehicle acquires the traffic signal information by receiving the packet signal. The GW controller of the vehicle derives a speed, etc. to pass a green light at a traffic intersection based on the traffic signal information and the route information from the car navigation system and notifies the driver of the result.

In GW driving as described above, the timing of acceleration or deceleration is different from that of normal driving. Drivers of nearby vehicles are not aware of the reason behind such driving. In order to reduce near-end accidents occurring for this reason, the notification device performs the following process. The notification device may be implemented by a standalone hardware device. In this case, it will be assumed that the notification device is implemented as an application of a terminal apparatus by way of example. The terminal apparatus stores information indicating that GW control is in effect in a packet signal and broadcasts the packet signal. Other terminal apparatuses mounted in vehicles behind receive the packet signal and notifies the drivers of the vehicles behind that the vehicle running in front is under GW control. For clarity, a description will be given below of 1. a summary of the communication system for broadcasting a packet signal and then 2. notification of GW control.

I. Summary of the Communication System

FIG. 1 shows the structure of a communication system 100 according to the first embodiment. The illustration is a view from above a given traffic intersection. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, an eighth vehicle 12h, which are generically referred to as vehicles 12, and a network 202. Although only the first vehicle 12a is shown to have a terminal apparatus, the terminal apparatus 14 is mounted in each vehicle 12. An area 212 is formed around the base station apparatus 10 and an outlying area 214 is formed outside the area 212.

As illustrated, the road that runs in the transversal direction in the figure, i.e., that runs leftward and rightward, and the road that runs in the vertical direction in the figure, i.e., that runs upward and downward, intersect at the center. The top of the figure corresponds to compass "north", the left side corresponds to compass "west", the bottom corresponds to compass "south", and the right side corresponds to compass "east". The intersection of the two roads represents a "traffic intersection". The first vehicle 12a and the second vehicle 12b are traveling from left to right, and the third vehicle 12c and the fourth vehicle 12d are traveling from right to left. Further, the fifth vehicle 12e and the sixth vehicle 12f are traveling from top to bottom, and the seventh vehicle 12g and the eighth vehicle 12h are traveling from bottom to top.

In the communication system 100, the base station apparatus is fixedly placed at the traffic intersection. The base station apparatus 10 controls communication between terminal apparatuses. The base station apparatus 10 repeatedly generates frames each including a plurality of subframes based on a signal received from a Global Positioning System (GPS) satellite (not shown) or a frame formed by another base station apparatus (not shown). The frames are defined such that a road-to-vehicle transmission period can be provided at the start of each subframe.

Of a plurality of subframes in a frame, the base station apparatus 10 selects a subframe in which a road-to-vehicle transmission period is not defined by another base station apparatus 10. The base station apparatus 10 defines a road-to-vehicle transmission period at the start of the selected subframe. The base station apparatus 10 broadcasts a packet signal during the road-to-vehicle transmission period thus defined. A plurality of packet signals may be broadcast during a road-to-vehicle transmission period. For example, a packet signal includes traffic accident information, traffic jam information, signal information, etc. A packet signal also includes information related to the timing of defining the road-to-vehicle transmission period and control information related to frames.

As described above, the terminal apparatus 14 is mounted on the vehicle 12 and so is movable. When the terminal apparatus 14 receives a packet signal from the base station apparatus 10, the terminal apparatus 14 estimates that the terminal apparatus 14 is located in the area 212. While in the area 212, the terminal apparatus 14 generates a frame based on the control information included in the packet signal and, in particular, the information related to the timing of defining the road-to-vehicle transmission period and the information related to frames. As a result, the frame generated in each of the plurality of terminal apparatuses 14 is synchronized with the frame generated in the base station apparatus 10. The terminal apparatus 14 broadcasts a packet signal in an inter-vehicle transmission period different from the road-to-vehicle transmission period. CSMA/CA is used in the inter-vehicle transmission period. Meanwhile, when the terminal apparatus 14 estimates that the terminal apparatus 14 is located in the outlying area 214, the terminal apparatus 14 broadcasts a packet signal by using CSMA/CA irrespective of the frame structure.

Figure 2:
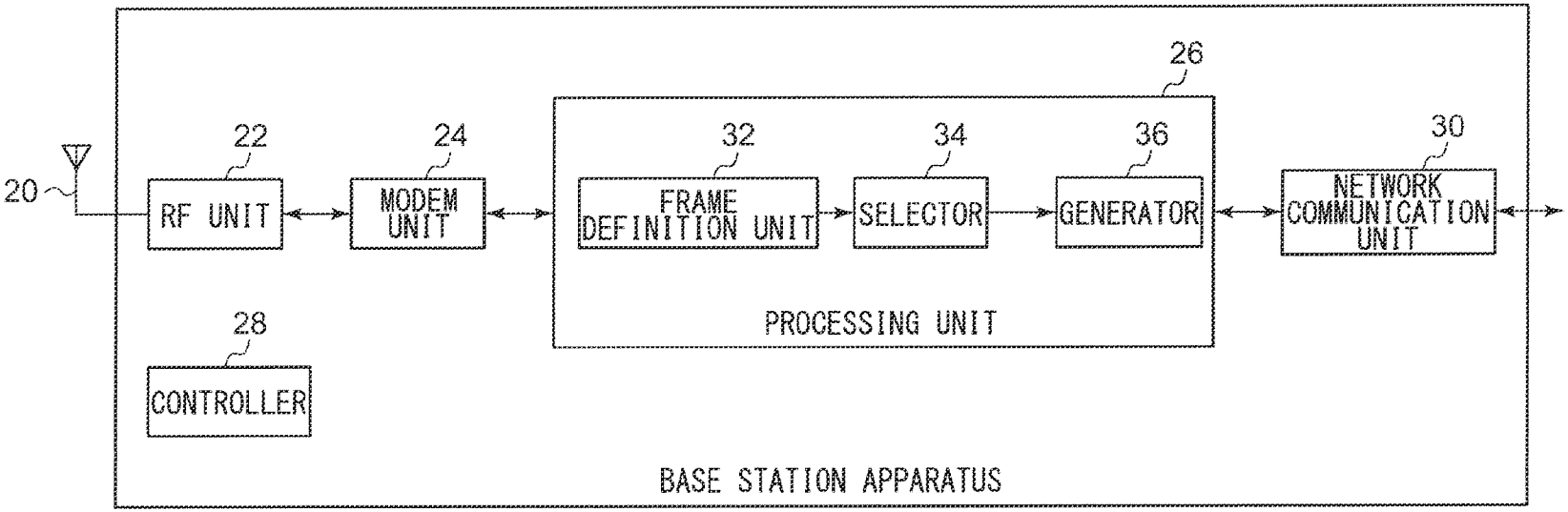
FIG. 2 shows the structure of the base station apparatus of FIG. 1.

FIG. 2 shows the structure of the base station apparatus 10. The base station apparatus 10 includes an antenna 20, an RF unit 22, a modem unit 24, a processing unit 26, a controller 28, and a network communication unit 30. The processing unit 26 includes a frame definition unit 32, a selector 34, and a generator 36.

In a reception process, the RF unit 22 receives a packet signal from the terminal apparatus 14 or another base station so apparatus 10 (not shown) at the antenna 20. The RF unit 22 subjects the radio frequency packet signal thus received to frequency conversion so as to generate a baseband packet signal. Further, the RF unit 22 outputs the baseband packet signal to the modem unit 24. Generally, a baseband packet signal is formed of an in-phase component and a quadrature component. Therefore, two signal lines should be shown. For clear illustration, the figure only shown one signal line. The RF unit 22 also includes a Low Noise Amplifier (LNA), a mixer, an AGC, and an A/D converter.

In a transmission process, the RF unit 22 subjects the baseband packet signal input from the modem unit 24 to frequency conversion so as to generate a radio frequency packet signal. Further, the RE unit 22 transmits the radio frequency packet signal from the antenna 20 in a road-to-vehicle transmission period. The RF unit 22 also includes a Power Amplifier (PA), a mixer, and a D/A converter. For example, a radio frequency of 700 MHz is used.

In a reception process, the modem unit 24 subjects the baseband packet signal from the RF unit 22 to demodulation. Further, the modem unit 24 outputs the demodulated result to the processing unit 26. In a transmission process, the modem unit 24 subjects data from the processing unit 26 to modulation. Further, the modem unit 24 outputs the modulated result to the RF unit 22 as a baseband packet signal. The communication system 100 supports the Orthogonal Frequency Division Multiplexing (OFDM) modulation scheme. Therefore, the modem unit 24 also performs Fast Fourier Transform (FFT) in a reception process and Inverse Fast Fourier Transform (IFFT) in a transmission process.

The frame definition unit 32 receives a signal from a GPS satellite (not shown) and retrieves time information by referring to the received signal. A publicly known technology may be used to retrieve time information so that a description thereof is omitted. The frame definition unit 32 generates a plurality of frames based on the time information. For example, the frame definition unit 32 generates 10 "100 msec" frames by dividing a period of "1 sec" into 10 with reference to the timing indicated by the timing information. By repeating the process, frames are repeated. The frame definition unit 32 may detect control information from the demodulated result and generate frames based on the detected control information. Such a process translates into generating frames synchronized with the timing of frames formed by another base station apparatus 10.

Figures 3A, 3B, 3C, 3D:
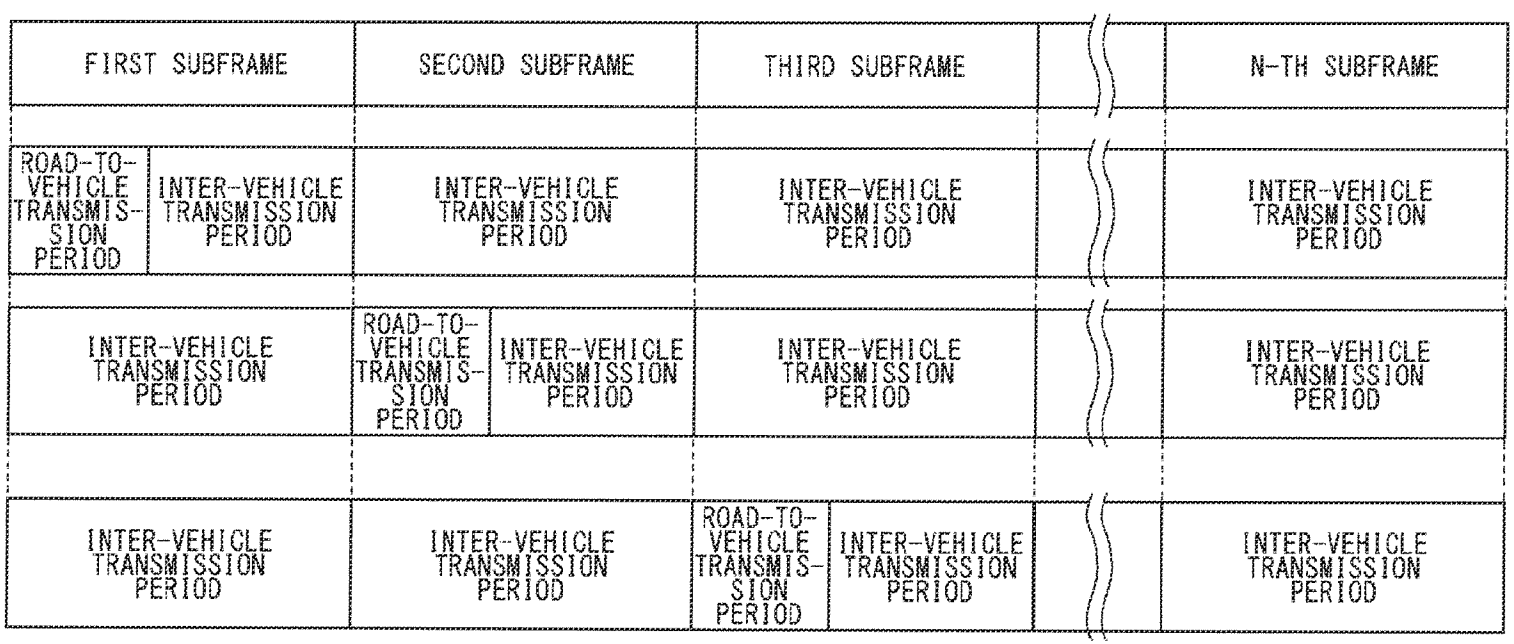
FIGS. 3A-3D show the format of a frame defined in the communication system of FIG. 1.

FIGS. 3A-3D show the format of a frame defined in the communication system 100. FIG. 3A shows a frame structure. A frame is formed by N subframes illustrated as first through N-th subframes. It can be said that a frame is formed by multiplexing subframes available for broadcasting by the terminal apparatus 14 in multiple time windows. For example, given that the length of a frame is 100 msec and N is equal to 8, subframes each having a length of 12.5 msec are defined. N may be other 8. A description with reference to FIGS. 3B-3D will be given later. Reference is made back to FIG. 2.

Of the plurality of subframes included in a frame, the selector 34 selects a subframe in which a road-to-vehicle transmission period should be defined. To describe it more specifically, the selector 34 accepts a frame defined by the frame definition unit 32. Also, the selector 34 accepts an instruction related to a selected subframe via an interface (not shown). The selector 34 selects a subframe designated by the instruction. Aside from this, the selector 34 may automatically select a subframe. In this process, the selector 34 may receive a result of demodulation from another base station apparatus 10 or the terminal apparatus 14 (not shown) via the RF unit 22 and the modem unit 24. The selector 34 refers to the input demodulation results and extracts a result of demodulation from another base station apparatus 10. The selector 34 identifies a subframe in which a result of demodulation is not received by identifying a subframe in which a result of demodulation is received.

This translates into identifying a subframe in which a road-to-vehicle transmission period is not defined by another base station apparatus 10, i.e., identifying an unused subframe. If there are a plurality of unused subframes, the selector 34 selects one subframe at random. If no unused subframes are available, i.e., if each of the plurality of subframes is used, the selector 34 acquires reception power corresponding to the result of demodulation and selects a subframe with small reception power in preference to the other subframes.

FIG. 3B shows the structure of a frame generated by a first base stations apparatus 10a (not shown). The first base station apparatus 10a defines a road-to-vehicle transmission period at the start of the first subframe. The first base station apparatus 10a also defines an inter-vehicle transmission period to succeed the road-to-vehicle transmission period in the first subframe. An inter-vehicle transmission period is a period in which the terminal apparatus 14 can broadcast a packet signal. In other words, the first base station apparatus 10a defines the frame such that a packet signal can be transmitted in a road-to-vehicle transmission period at the start of the first subframe, and the terminal apparatus 14 can broadcast a packet signal in the inter-vehicle transmission period provided in the frame in addition to the road-to-vehicle transmission period. Further, the first base station apparatus 10a defines only inter-vehicle transmission periods in the second through N-th subframes.

FIG. 3C shows the structure of a frame generated by a second base station apparatus 10b (not shown). The second base station apparatus 10b defines a road-to-vehicle transmission period at the start of the second subframe. The second base station apparatus 10b also defines inter-vehicle transmission periods subsequent to the road-to-vehicle transmission period in the second subframe, and in the first subframe, and the third through N-th subframes. FIG. 3D shows the structure of a frame generated by a third base station apparatus 10c (not shown). The third base station apparatus 10c defines a road-to-vehicle transmission period at the start of the third subframe. The third base station apparatus 10c also defines inter-vehicle transmission periods subsequent to the road-to-vehicle transmission period in the third subframe, and in the first subframe, the second subframe, and the fourth through N-th subframes. Thus, the plurality of base station apparatuses 10 select mutually different subframes and define a road-to-vehicle transmission period at the start of the selected subframe. Reference is made back to FIG. 2. The selector 34 outputs the number of the selected subframe to the generator 36.

The generator 36 receives the number of the subframe from the selector 34. The generator 36 defines a road-to-vehicle transmission period in the subframe having the subframe number received and generates a packet signal that should he broadcast in the road-to-vehicle transmission period. If a plurality of packet signals are transmitted in a single road-to-vehicle transmission period, the generator 36 generates those packet signals. A packet signal is comprised of control information and a payload. The control information includes the number of the subframe in which the road-to-vehicle transmission period is defined. The payload includes, for example, accident information, traffic jam information, and traffic signal information. These data are acquired by the network communication unit 30 from the network 202 (not shown) The processing unit 26 causes the modem unit 24 and the RF unit 22 to broadcast the packet signal in the road-to-vehicle transmission period. The controller 28 controls the process of the base station apparatus 10 as a whole.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 4:
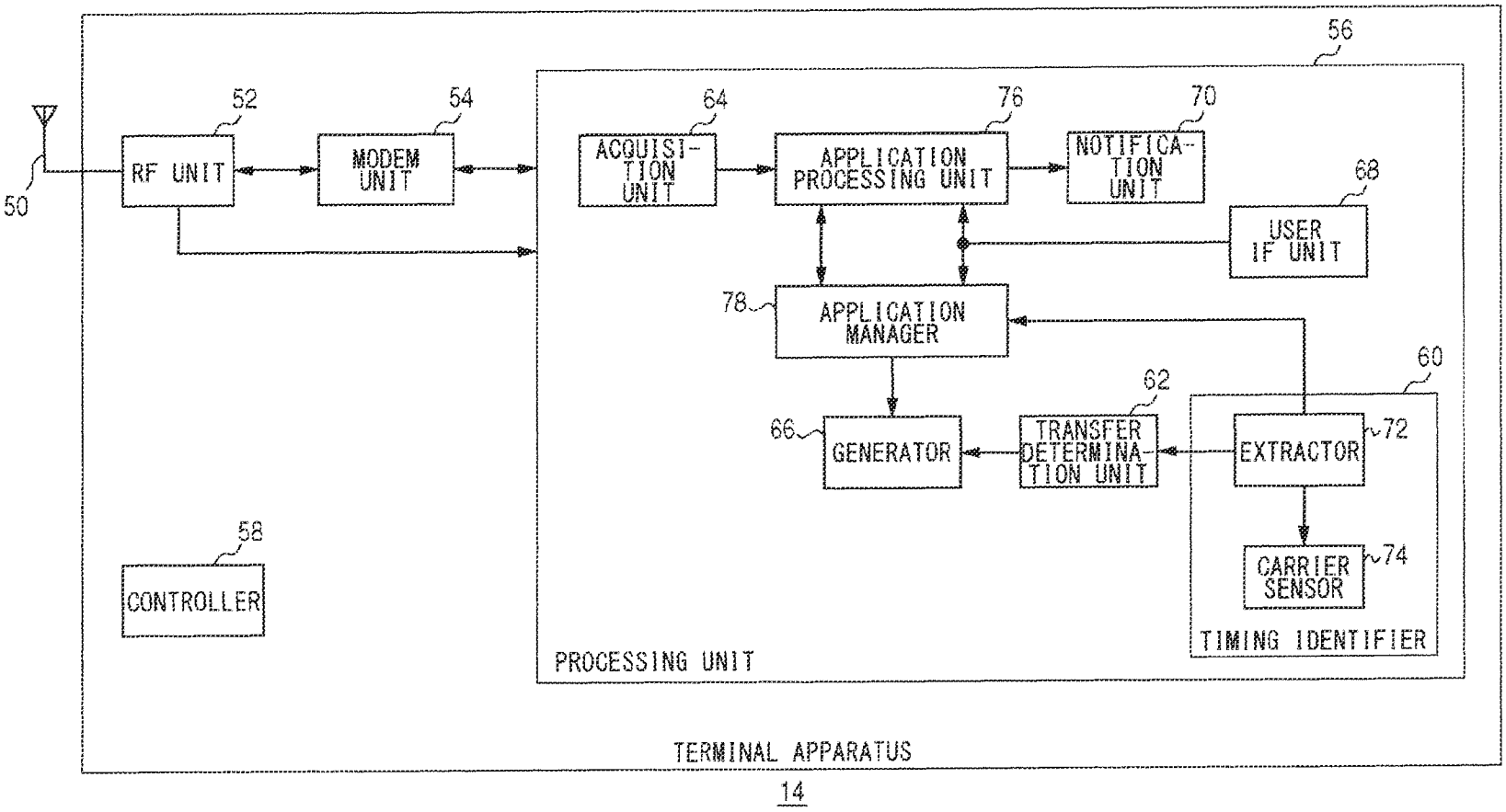
FIG. 4 shows the structure of the terminal apparatus mounted in the vehicle of FIG. 1.

FIG. 4 shows the structure of the terminal apparatus 14 mounted in the vehicle 12. The terminal apparatus 14 includes an antenna 50, an RF unit 52, a modem unit 54, a processing unit 56, and a controller 58. The processing unit 56 includes a timing identifier 60, a transfer determination unit 62, an acquisition unit 64, a generator 66, a user IF unit 68, a notification unit 70, an application processing unit 76, and an application manager 78. The timing identifier 60 includes an extractor 72 and a carrier sensor 74. The antenna 50, the RE unit 52, and the modem unit 54 performs processes similar to those of the antenna 20, the RE unit 22, and the modem unit 24 of FIG. 2. The difference will be discussed below.

In a reception process, the modem unit 54 and the processing unit 56 receive a packet signal from another terminal apparatus 14 or the base station apparatus 10 (not shown). As described above, the modem unit 54 and the processing unit 56 receive a packet signal from the base station apparatus 10 in a road-to-vehicle transmission period and receive a packet signal from another terminal apparatus 14 in an inter-vehicle transmission period.

If a result of demodulation provided front the modem unit 54 indicates a packet signal from the base station apparatus 10 (not shown), the extractor 72 identifies the timing of a subframe in which a road-to-vehicle transmission period is defined. In this process, the extractor 72 estimates that the terminal apparatus 14 is located in the area 212 of FIG. 1. The extractor 72 generates a frame based on the timing of the subframe and the content of message header of the packet signal. As a result, the extractor 72 generates a frame synchronized with the frame formed in the base station apparatus 10. If the source of broadcasting of the packet signal is another terminal apparatus 14, the extractor 72 omits the process of generating a synchronized frame. If the terminal apparatus 14 is located in the area 212, the extractor 72 identifies the road-to-vehicle transmission period in use and then identifies the inter-vehicle transmission periods. The extractor 72 outputs the tinting of the frame and the subframes and information related to the inter-vehicle transmission periods to the carrier sensor 74.

Meanwhile, if the extractor 72 does not receive a packet signal from the base station apparatus 10, i.e., if the extractor 72 does not generate frames synchronized with the base station apparatus 10, the extractor 72 estimates that the terminal apparatus 14 is located in the outlying area 214 of FIG. 1. If the terminal apparatus 14 is located in the outlying area 214, the extractor 72 directs the carrier sensor 74 to perform carrier sensing unrelated to the frame structure.

The carrier sensor 74 receives the timing of the frame and the subframes and information related to the inter-vehicle transmission periods from the extractor 72. The carrier sensor 74 determines the timing of transmission by initiating CSMA/CA in an inter-vehicle transmission period. This translates into defining a Network Allocation Vector (NAV) in the road-to-vehicle transmission period and performs carrier sensing in periods other than the period in which the NAV is defined. Meanwhile, if carrier sensor 74 is directed by the extractor 72 to perform carrier sensing unrelated to the frame structure, the carrier sensor 74 determines the timing of transmission by performing CSMA/CA, disregarding the frame structure. The carrier sensor 74 communicates the determined timing of transmission to the modem unit 54 and the RF unit 52 so as to cause a packet signal to be broadcast.

The transfer determination unit 62 controls transfer of control information. The transfer determination unit 62 refers to the control information and extracts information that should he transferred. The transfer determination unit 62 determines the information that should be transferred based on the extracted information. A description of this process is omitted. The transfer determination unit 62 outputs the information that should be transferred, i.e., a part of the control information, to the generator 66. The generator 66 receives data from the application manager 78 and receives a part of the control information from the transfer determination unit 62. Data received from the application manager 78 will be described later. The generator 66 generates a packet signal by storing a part of the control information thus received in the control information and storing the data in the payload. The processing unit 56, the modem unit 54, and the RF unit 52 successively broadcast a plurality of packet signals generated by the generator 66. The controller 58 controls the operation of the terminal apparatus 14.

The acquisition unit 64 includes a GPS receiver, a gyroscope, a vehicle speed sensor, etc. (not shown). The acquisition unit 64 refers to data supplied from these units so as to acquire a position, a direction of travel, a speed of movement, etc. (hereinafter, referred to as "position information") of the vehicle 12 (not shown), i.e. the vehicle 12 in which the terminal apparatus is mounted. The position is denoted by longitude and latitude. A publicly known technology could be used for acquisition so that a description thereof is omitted. The GPS receiver, the gyroscope, the vehicle speed sensor, etc. may be provided outside the terminal apparatus 14. The acquisition unit 64 outputs the position information to the application processing unit 76.

The application processing unit 76 can execute a plurality of types of applications. Each application is executed in a plurality of terminal apparatuses 14. In other words, the transmitting terminal apparatus 14 generates data and broadcasts a packet signal storing the data. The receiving terminal apparatus 14 receives the packet signal and performs a predefined process based on the data included in the packet signal. Therefore, a given application is divided into a process at the transmitting end (hereinafter, referred to as "transmitter application") and a process at the receiving end (hereinafter, "receiver application"). It should be noted that the transmitter application and the receiver application executed in a given terminal apparatus 14 need not match. Hereinafter, the transmitter application and the receiver application may generically referred to as applications.

The plurality of types of applications are categorized as follows. One category is a common application. A common application is an application to alert the driver of the approach of another vehicle 12 and is executed in all terminal apparatuses 14. The application processing unit 76 receives position information from the acquisition unit 64 when executing the transmitter application in the common application. Further, the application processing unit 76 periodically outputs position information to the application manager 78.

Meanwhile, in executing the receiver application in the common application, the application processing unit 76 acquires position information included in a packet signal from another terminal apparatus 14 from the application manager 78. The application processing unit 76 detect the approach of another vehicle 12 based on the position information of another terminal apparatus 14 acquired from the application manager 78 and the position information received from the acquisition unit 64. The application processing unit 76 causes the notification unit 70 to notify the driver of the approach of another vehicle 12. The notification unit 70 notifies the driver accordingly via a monitor or a speaker. The second category is a free application. A free application is executed only in a selected terminal apparatus 14 and not in all of the terminal apparatuses 14. A plurality of free applications may be executed simultaneously.

Given the above-defined system, the application processing unit 76 executes a transmitter application in a free application that is allowed to be registered and outputs generated data to the application manager 78. Meanwhile, the application processing unit 76 executes the receiver application by processing the data received from the application manager 78 as determined by the free application.

The application manager 78 manages a transmitter application by acknowledging an application registration request from the user IF unit 68. Subsequently, the application manager 78 receives a plurality of data items from the application processing unit 76 and outputs the plurality of data items, which are used to generate a packet signal, to the generator 66 so as to cause the generator 66 to generate a packet signal based on the plurality of data items.

Meanwhile, the application manager 78 manages a receiver application by receiving the data stored in a packet signal received by the extractor 72. Of the received data, the application manager 78 outputs the data corresponding to the receiver application executed in the application processing unit 76 to the application processing unit 76. The application manager 78 discards the other data.

To summarize the above, the base station apparatus 10 and the terminal apparatus 14 in the communication system 100 both perform communication at a period of about 10 ms. Road-to-vehicle communication and inter-vehicle communication are time-division multiplexed in order to reduce interference between road-to-vehicle communication and inter-vehicle communication. The base station apparatus 10 includes the transmission time and information on the road-to-vehicle communication period in a packet signal and notifies the surrounding terminal apparatuses accordingly in order to secure a road-to-vehicle communication period. The terminal apparatus 14 in the area 212 transmits a packet signal using CSMA/CA at a point of time outside the road-to-vehicle communication period by establishing time synchronization based on the transmission time received from the base station apparatus 10 and suspending transmission based on the information on the road-to-vehicle communication period. The payload of inter-vehicle communication is comprised of data for a common application and data for a free application.

Figure 5:
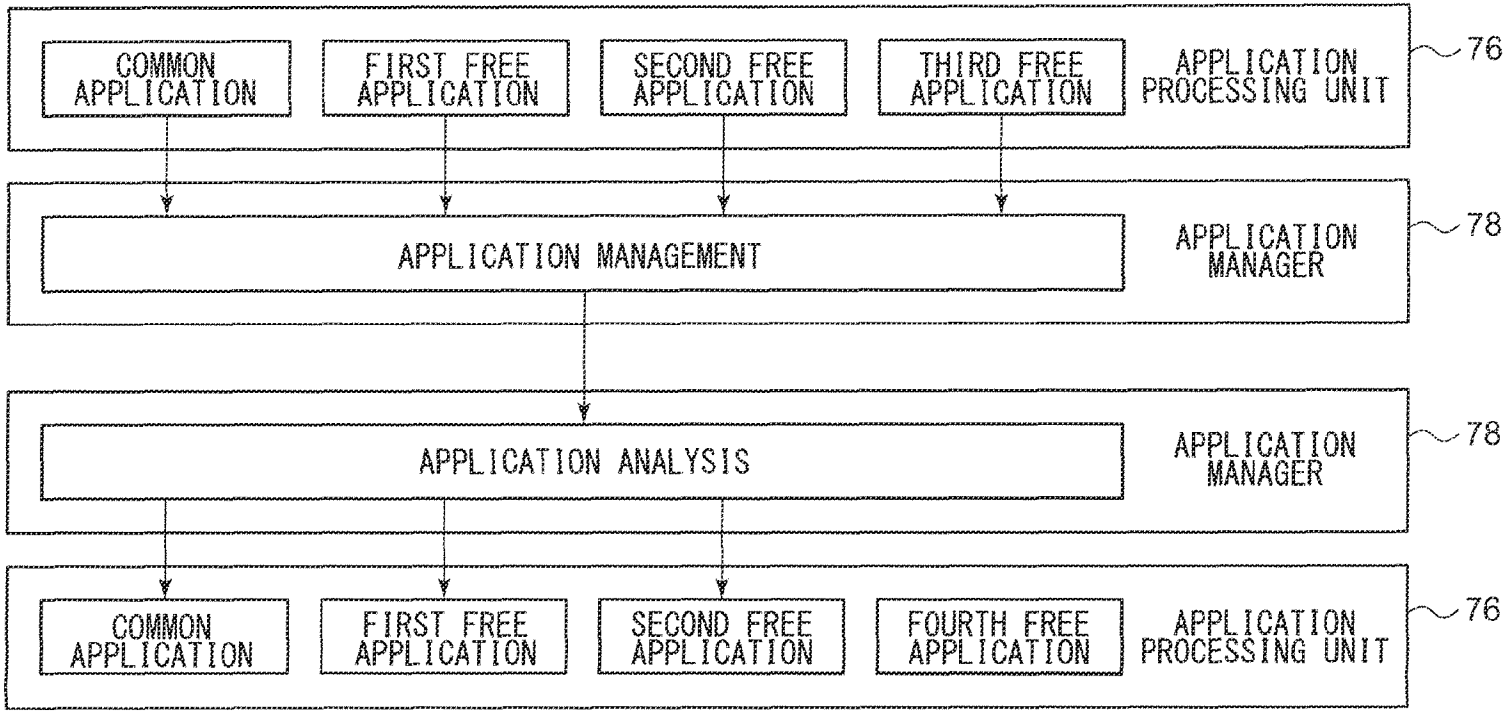
FIG. 5 shows a protocol stack in the terminal apparatus of FIG. 4.

A description will he given hereinafter of processes in the application processing unit 76 and the application manager 78. To describe how a plurality of applications are processed on the whole, a protocol stack involving the application processing unit 76 and the application manager 78 will he used. FIG. 5 shows a protocol stack in the terminal apparatus 14. The application processing unit 76 and the application manager 78 in the two top layers are included in the terminal apparatus 14 at the transmitting end and so perform a process for a transmitter application. The application manager 78 and the application processing unit 76 in the two bottom layers are included in the terminal apparatus 14 at the receiving end and so perform a process for a receiver application. The application processing unit 76 at the transmitting end executes a plurality of types of applications. It will be assumed that a common application, a first free application, a second free application, and a third free application are executed. The application processing unit 76 outputs the data corresponding to the respective applications to the application manager 78.

The application manager 78 manages applications run in the application processing unit 76. Further, the application manager 78 at the transmitting end receives a plurality of data items from the application processing unit 76 and aggregates a plurality of data items in order to store them in a single packet signal. The packet signal in which a plurality of data items are aggregated is output from the application manager 78.

The application manager 78 at the receiving end receives the packet signal in which the plurality of data items are aggregated. The application manager 78 extracts the data for the common application included in the packet signal and outputs the extracted data to the application processing unit 76. Further, the application manager 78 managers the free application run in the application processing unit 76 in the subsequent stage and extracts the data corresponding to the free application that is being run. In this process, the data is extracted by referring to an application ID included in the header for the free application. The application manager 78 outputs the extracted data to the application processing unit 76. Meanwhile, the application manager 78 discards the remaining data. For example, the third free application is not being run in the application processing unit 76 in the subsequent stage so that the application manager 78 discards the data for the third free application. The application processing unit 76 receives the data from the application manager 78 and executes the application corresponding to the data. In this process, it will be assumed that the common application, the first free application, the second free application, and the fourth free application are being run.

2. Notification of GW Control

Figure 6:
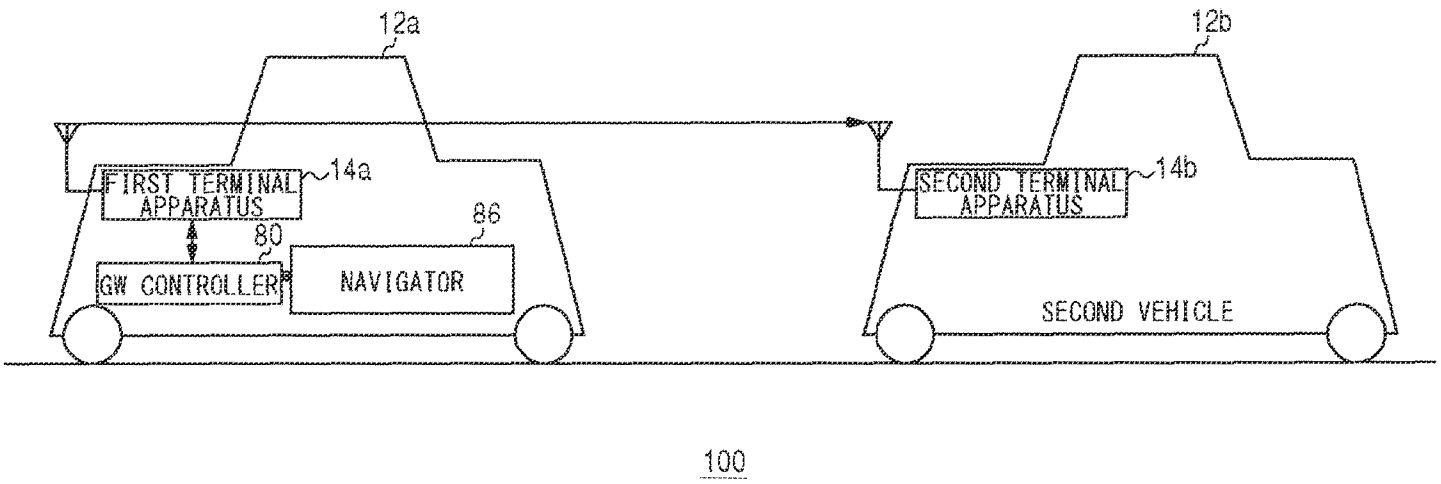
FIG. 6 shows an alternative structure of the communication system according to the embodiment.

A description will now he given of a process performed when GW control of the vehicle 12 is in effect. FIG. 6 shows an alternative structure of the communication system 100 according to the embodiment. For clarity of description, the figure shows only two vehicles, namely, the first vehicle 12a and the second vehicle 12b traveling from right to left. In other words, the first vehicle 12a is traveling in front, followed by the second vehicle 12b. In reality, the number of vehicles 12 may not be two. The first vehicle 12a includes a first terminal apparatus 14a, a GW controller 80, and a navigator 86. The second vehicle 12b includes a second terminal apparatus 14b. This translates into the fact that the first vehicle 12a is subject to GW control and the second vehicle 12b is not subject to GW control. The first vehicle 12a and the second vehicle 12b will be generically referred to as vehicles 12. The first terminal apparatus 14a and the second terminal apparatus 14b will be generically referred to as terminal apparatuses 14.

The navigator 86 in the first vehicle 12a receives the position information from the first terminal apparatus 14a and runs mute guidance based on the position information. For this purpose, the navigator 86 derives a route from the current position of the running vehicle to the destination based on the current position of the running vehicle and the position of the destination. The navigator 86 may determine the position information by receiving a signal from a GPS satellite (not shown). A publicly known technology may be used to derive a route so that a description thereof is omitted. The navigator 86 notifies the driver of the route by creating a map image reflecting the derived route and displaying the map image on a monitor. Sound may be output from a speaker so as to provide route guidance.

The GW controller 80 receives the route derived by the navigator 86 and receives the position information and the signal information from the first terminal apparatus 14a. The GW controller 80 derives a speed that allows the vehicle to pass a plurality fo signals included in the route with the traffic lights turned green. Further, the GW controller 80 checks for possible turns at traffic intersections along the route. The GW controller 80 directs the driver to drive the vehicle in a GW mode by displaying the information on the derived speed and the information on possible turns checked. The direction may be provided in sound. The driver drives the vehicle in a GW mode according to the direction. Apart from this, the GW controller 80 may directly control the driving of the first vehicle 12a according to the information on the derived speed and the information on possible turns checked. This translates into automatic driving and a description thereof will be omitted.

The first terminal apparatus 14a acquires the position information and the traffic signal information by performing the process substantially as already described and outputs the position information and the traffic signal information to the GW controller 80 and the navigator 86. When GW driving is performed by the GW controller 80, the first terminal apparatus 14a stores information indicating that "GW control is in effect" in a packet signal and broadcasts the packet signal. The packet signal may further include information indicating that "the speed changes" or "the vehicle turns right or left". A detailed description on the information included in the packet signal will be given later. The function of the first terminal apparatus 14a for performing the process described above represents the notification device.

The second terminal apparatus 14b receives the packet signal from the first terminal apparatus 14a. The second terminal apparatus 14b extracts the information indicating "GW control is in effect" from the received packet signal and notifies the driver of the information. As a result, the driver of the second vehicle 12b knows that the first vehicle 12a is being driven in a GW mode. The driver also understands that unexpected acceleration or deceleration of the first vehicle 12a is due to GW driving. A similar process is performed when the received packet signal includes information indicating that "the speed changes" or "the vehicle turns right or left". Accordingly, the driver of the second vehicle 12b can know that the change in the speed of the first vehicle 12a, or the right or left turn thereof is due to GW driving.

Figure 7:
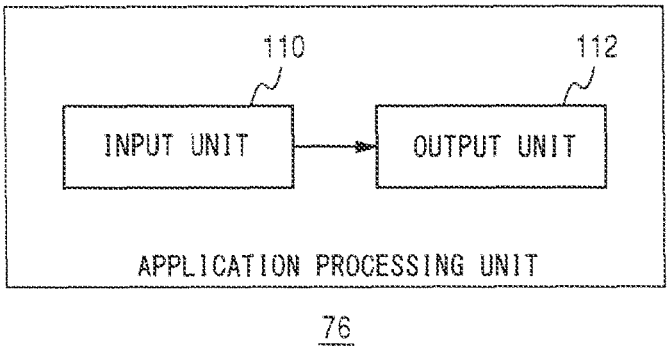
FIG. 7 shows the structure of the application processing unit of FIG. 4.

FIG. 7 shows the structure of the application processing unit 76. The application processing unit 76 includes an input unit 110 and an output unit 112. The illustrated structure is related to an application for notifying that GW control is in effect, which is one of the transmitter applications executed in the application processing unit 76. The application is a free application and corresponds to the notification device mounted on the vehicle 12.

The input unit 110 acquires the information indicating that "GW control is in effect" from the GW controller 80 (not shown), i.e., acquires the information indicating that the driver's vehicle 12 is receiving driving assistance. The information is input when the GW controller SO is started. The input unit 110 also acquires the information indicating that "the speed changes" or "the vehicle turns right or left" from the GW controller 80 (not shown), i.e., the information indicating that the running condition is changed due to the driving assistance. The information is input when the speed changes, or when the vehicle turns right or left. The speed is defined as changing when a difference between the speed derived by the GW controller 80 and the current speed is equal to or greater than a threshold value. The input unit 110 may only receive the information indicating that "GW control is in effect" and not receive the information indicating that "the speed changes" or "the vehicle turns right left".

The output unit 112 outputs the information indicating that GW control is effect and acquired in the input unit 110 to the application manager 78. Ultimately, the information indicating that GW control is in effect is included in a packet signal and broadcast. As a result, the output unit 112 outputs notification to other vehicles 12 in accordance with the information indicating that GW control is in effect. In other words, the output unit 112 broadcasts the information indicating that the vehicle is receiving GW driving assistance to the vehicles 12 around.

When the input unit 110 acquires the information indicating that the speed changes or the information indicating that the vehicle turns right or left, the output unit 112 outputs the information to the application manager 78. Ultimately, that information is also included in the packet signal and broadcast. As a result, the output unit 112 outputs notification to other vehicles 12 in accordance with the information indicating that the speed changes or the information indicating that the vehicle turns right or left. In other words, the likelihood that the vehicle may be accelerated or decelerated due to the driving assistance it receives is broadcast to the vehicles around. In particular, notification is given before the speed changes, or before the vehicle turns right or left actually. That the speed changes, or the vehicle turns right or left translates into change in the running condition induced by the driving assistance.

Figure 8A:
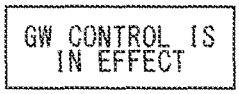
FIGS. 8A-8C show the data structure of data output from the application processing unit of FIG. 7.
Figure 8B:
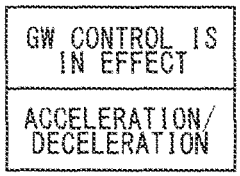
Figure 8C:
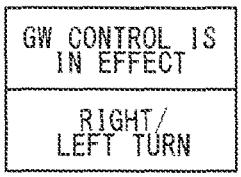

FIGS. 8A-8C show the data structure of the data output from the application processing unit 76. FIG. 8A shows a case where the data includes information indicating that GW control is in effect and does not include information indicating that the speed changes or the information indicating that the vehicle turns right or left. FIG. 8B shows a case where the data includes information indicating that GW control is in effect and information indicating that the speed changes. FIG. 8C shows a case the data includes information indicating that GW control is in effect and information indicating that the vehicle turns right or left.

A description will now be given of the operation of the communication system 100 configured as described above.

Figure 9:
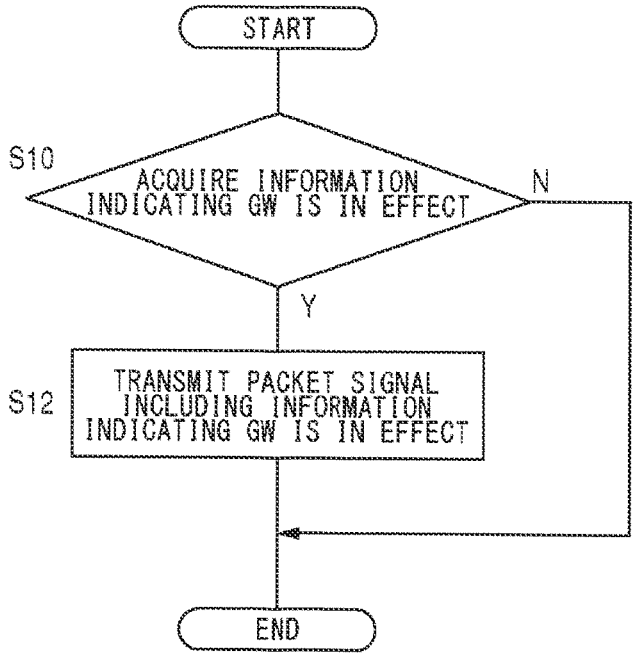
FIG. 9 is a flowchart showing steps of transmitting a packet signal performed by the terminal apparatus of FIG. 5.

FIG. 9 is a flowchart showing steps of transmitting a packet signal performed by the terminal apparatus 14. If the input unit 110 acquires information indicating that GW control is in effect (Y in S10), the output unit 112 transmits a packet signal including the information indicating that GW control is in effect (S12). Meanwhile, if the input unit 110 does not acquire information indicating that GW control is in effect (N in S10), the process is terminated.

Figure 10:
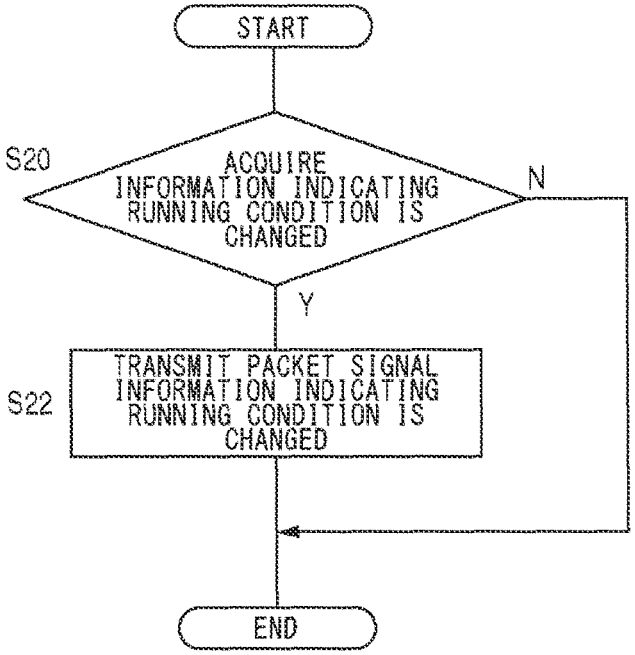
FIG. 10 is a flowchart showing alternative steps of transmitting a packet signal performed by the terminal apparatus of FIG. 5.

FIG. 10 is a flowchart showing alternative steps of transmitting a packet signal performed by the terminal apparatus 14. If the input unit 110 acquires information indicating that the running condition is changed (Y in S20), the output unit 112 transmits a packet signal including the information indicating a change (S22). Meanwhile, if the input unit 110 does not acquire information indicating that the running condition is changed (N in S20), the process is terminated.

When the vehicle according to the embodiment acquires information indicating that the driver's vehicle is receiving driving assistance, the vehicle outputs notification to other vehicles. Thus, the drivers of the other vehicles can know that the notifying vehicle is receiving driving assistance. Since the drivers of the other vehicles can know that the notifying vehicle is receiving driving assistance, the stress felt by the drivers can be reduced. By reducing the stress, accidents induced by the vehicle receiving driving assistance are reduced.

As the information indicating that the speed is increased or decreased, or the information indicating the vehicle turns right or left is acquired, notification is output to other vehicles. Therefore, the drivers of the other vehicles can know that the speed of the notifying vehicle is increased or decreased, or the vehicle turns right or left due to the driving assistance received. Because the notification is given before the running condition is changed, it can be made clear that the notification is output because the speed is increased or decreased, or the vehicle turns right or left due to the driving assistance received by the notifying vehicle. By declaring that the driver is receiving driving assistance and revealing the reason for the behavior or letting the other drivers know the behavior in advance, the other drivers are prevented from feeling uncomfortable. By understanding the driving policy and following that policy, the vehicles around can also benefit from automatic driving assistance of green wave driving assistance indirectly.

Second Embodiment

Like the first embodiment, the second embodiment also assumes a communication system in which road-to-vehicle communication as well as inter-vehicle communication takes place, and relates to a notification device capable of notifying vehicles around that that acceleration or deceleration, or right or left turn of the notifying vehicle is induced by GW driving. In the second embodiment, as in the first embodiment, the notification device is implemented as an application of a terminal apparatus. The notification device according to the first embodiment knows that the vehicle is driven in a GW mode. The notification device according to the second embodiment determines that the vehicle is being driven in a GW mode on its own. Thus, if a vehicle is being driven in a manner similar to GW driving, the notification device mounted in the vehicle notifies other vehicles that the notifying vehicle is being driven in a GW mode regardless of whether the notifying vehicle is being driven in a GW mode. In other words, a determination is made as to whether the vehicle is being manually (as opposed to automatically) driven in a GW mode. If it is determined that the vehicle is being driven in a GW mode, information indicating that the vehicle is changed by referring to the signal information, etc. is broadcast. The communication system 100, the base station apparatus 10, and the terminal apparatus 14 according to the second embodiment are of the same type as those of FIGS. 1, 2, and 4. The following description concerns a difference. A description of 1. an outline of the communication system will be omitted, and 2. notification of GW control will be described.

Figure 11:
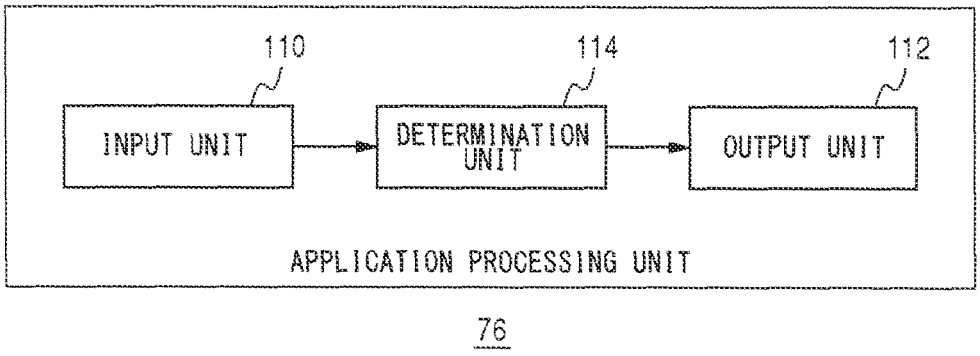
FIG. 11 shows the structure of the application processing unit according to the second embodiment.

FIG. 11 shows the structure of the application processing unit 76 according to the second embodiment. The application processing unit 76 includes the input unit 110, a determination unit 114, and the output unit 112. As in the case of the first embodiment, the illustrated structure is related to an application for indicating that GW control is in effect, which is one of the transmitter applications executed in the application processing unit 76.

The input unit 110 may or may not acquire the information indicating that "GW control is in effect" from the GW controller 80 (not shown), i.e., the information indicating that the driver's vehicle 12 is receiving driving assistance. In other words, the process according to the second embodiment does not depend on whether or not the information indicating that the driver's vehicle 12 is receiving driving assistance is received. Meanwhile, the input unit 110 also acquires the information indicating that "the speed changes" or "the vehicle turns right or left" from the GW controller 80 (not shown), i.e., the information indicating that the running condition is changed due to the driving assistance.

The determination unit 114 receives from the GW controller 80 the speed derived by the GW controller 80. The determination unit 114 also receives the current speed via the acquisition unit 64. The determination unit 114 derives a cumulative difference between these speed values. If the cumulative value is smaller than a threshold value, the determination unit 114 determines that the vehicle is being driven in a manner similar to GW driving. In other words, the determination unit 114 determines whether the running condition of the driver's vehicle 12 approximates the running condition achieved by driving assistance regardless of whether the information indicating that the driver's vehicle is receiving driving assistance is received or not.

If the determination unit 114 identifies similarity, the output unit 112 outputs the information indicating that GW control is in effect to the application manager 78. In other words, the determination unit 114 similarly outputs the information as it does when the input unit 110 receives the information indicating that the driver's vehicle 12 is receiving driving assistance. When the determination unit 114 identifies similarity and when the input unit 110 acquires the information indicating that the speed changes or the information indicating that the vehicle turns right or left, the output unit 112 also outputs the information to the application manager 78.

Figure 12:
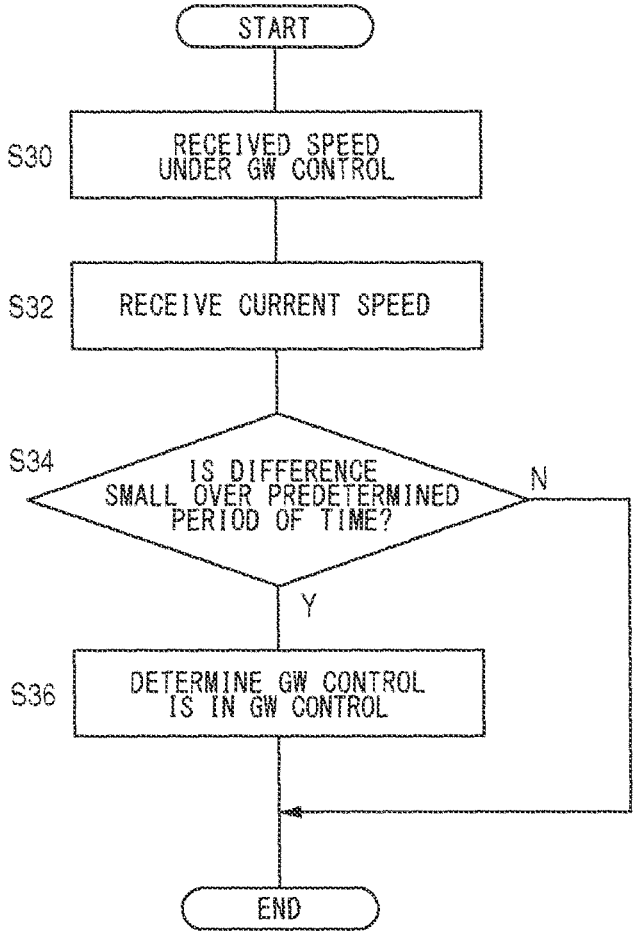
FIG. 12 is a flowchart showing steps of estimation performed by the application processing unit of FIG. 11.

FIG. 12 is a flowchart showing steps of estimation performed by the application processing unit 76. The determination unit 114 receives the speed under GW control (S30). The determination unit 114 receives the current speed (S32). If the difference between the speed values is small over a predetermined period (Y in S34), the determination unit 114 determines that GW control is in effect (S36). If the difference between the speed values is not small (N in S34), step 36 (S36) is skipped.

According to the second embodiment, notification given when the vehicle is receiving driving assistance is similarly given when the vehicle is in a running condition approximating the condition achieved by driving assistance. Therefore, the drivers of other vehicles can know that the notifying vehicle is virtually receiving driving assistance. Further, since the notification is given when the notifying vehicle is virtually in a running condition achieved by driving assistance, the drivers of other vehicles can know that the notifying vehicle is virtually traveling in a GW mode.

Third Embodiment

Like the foregoing embodiments, the third embodiment also relates to a notification device capable of notifying vehicles around that acceleration or deceleration, or right or left turn of a vehicle is induced by GW driving. Meanwhile, the communication system in which road-to-vehicle communication as well as inter-vehicle communication is performed may or may not be assumed in the third embodiment. The notification device according to the third embodiment gives notification that the vehicle is being driven in a GW mode by flashing the tail lamp, etc. The following description concerns the difference from the foregoing embodiments.

Figure 13:
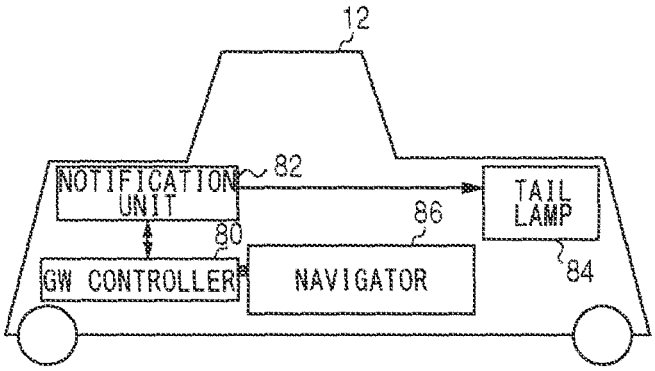
FIG. 13 shows the structure of the notification device according to the third embodiment.

FIG. 13 shows the structure of a notification device 82 according to the third embodiment. The vehicle 12 includes the notification device 82 and a tail lamp 84 in addition to the GW controller 80 and the navigator 86. The GW controller 80 and the navigator 86 are configured similarly as above. When the GW controller 80 is performing GW driving, the notification device 82 receives information indicating that "GW control is in effect" and notifies vehicles around that "GW control is in effect" by flashing the tail lamp 84. For example, this is done before decreasing the speed. Instead of flashing the tail lamp 84, the direction light may he flashed. In other words, an arbitrary state indicator capable of displaying the status may be used instead of the tail lamp 84. Still alternatively, the lamp or light may be lighted with brightness different from normal.

According to the third embodiment, vehicles around are notified that the vehicle is being driven in a GW mode by the flashing of a lamp, etc. Therefore, the drivers of other vehicles not provided with terminal apparatus can know that the notifying vehicle is being driven in a GW mode. Because the drivers of other vehicles not provided with a terminal apparatus can know that the notifying vehicle is being driven in a GW mode, the likelihood of implementation is increased.

Described above is an explanation based on an exemplary embodiment. The embodiment is intended to be illustrative only and it will be obvious to those skilled in the art that various modifications to constituting elements and processes could be developed and that such modifications are also within the scope.

In the first and second embodiments, ITS (e.g., ITS compatible with the standard for 700 Hz band intelligent transport systems) is used for communication between the plurality of terminal apparatuses 14. However, the example given is non-limiting. For example, the plurality of terminal apparatuses 14 may communicate with each other according to CSMA/CA as in wireless LAN. According to this variation, flexibility of communication between the plurality of terminal apparatuses 14 is improved.

The first through third embodiments are adapted to assist GW driving. However, the target of driving assistance may be ordinary automatic driving instead of GW driving. According to this variation, the target of driving assistance is extended.

In the first embodiment, notification from the output unit 112 is given before the speed actually changes or before the vehicle actually turns right or left. However, the example given is non-limiting. For example, if the vehicle 12 is provided with a device for preventing collision, notification may be given when an obstacle is detected and before the vehicle 12 is braked. According to this variation, notification is given before the vehicle is braked so that a collision accident is prevented from occurring.

Combinations of the first through third embodiments will also be useful. According to this variation, the advantages from an arbitrary combinations of the first through third embodiments are obtained.

In the embodiments described above, the packet signal may be compatible with the standard for 700 Hz band intelligent transport systems.

A summary of one embodiment is as described below. A notification device according to one embodiment is mounted on a vehicle and includes an acquisition unit that acquires information indicating that a driver's vehicle is receiving driving assistance, and an output unit that outputs notification to other vehicles in accordance with the information acquired by the acquisition unit.

According to this embodiment, when the information indicating that the driver's vehicle is receiving driving assistance, the driver's vehicle outputs notification to other vehicles. Therefore, the drivers of the other vehicles can know that the notifying vehicle is receiving driving assistance.

The acquisition unit may also acquire information indicating that a running condition is changed due to the driving assistance, and the output unit may output notification to the other vehicles when the acquisition unit acquires the information indicating that the running condition is changed due to the driving assistance. In this case, by outputting notification to the other vehicles when the information indicating that the running condition is changed is received, the drivers of the other vehicles can know that the running condition is changed due to the driving assistance.

The output unit may output notification to the other vehicles before the running condition is changed, when the acquisition unit receives the information indicating that the running condition is changed due to the driving assistance. In this case, the reason of notification is made clear by outputting notification before the running condition is changed.

The notification device may further include a determination unit that determines whether a running condition of the driver's vehicle approximates a running condition achieved by driving assistance, regardless of whether or not the acquisition unit acquires the information indicating that the driver's vehicle is receiving driving assistance. When the determination unit identifies similarity, the output unit may similarly output the information as it does when the acquisition unit acquires the information indicating that the driver's vehicle is receiving driving assistance. In this case, notification is similarly output when the running condition approximates the running condition achieved by driving assistance as it is when the notifying vehicle is receiving driving assistance. Therefore, the drivers of other vehicles can know that the notifying vehicle is virtually receiving driving assistance.

The notification device may further include a radio unit that transmits a packet signal including the notification output from the output unit. In this case, notification is issued widely because the notification is included in the packet signal.

The notification device may farther include a display unit that lights in accordance with the notification output from the output unit. In this case, by lighting the display unit in accordance with the notification, the notification is directly issued.

Another embodiment of the present invention relates to a vehicle. The vehicle has a notification device mounted thereon. The notification device includes an acquisition unit that acquires information indicating that a driver's vehicle is receiving driving assistance, and an output unit that outputs notification to other vehicles in accordance with the information acquired by the acquisition unit.

When the vehicle according to the embodiment of the present invention acquires information indicating that the vehicle is receiving driving assistance, the vehicle outputs notification to other vehicles. Thus, the vehicle can let the drivers of the other vehicles know that the notifying vehicle is receiving driving assistance.

What is claimed is:

[1. A notification device mounted on a vehicle, comprising:

an acquisition unit that acquires information indicating that a driver's vehicle is receiving driving assistance in which a speed is controlled to allow the driver's vehicle to pass a signal with a traffic light of the signal turned green;

an output unit that outputs notification to other vehicles in accordance with the information acquired by the acquisition unit; and a radio unit that transmits a packet signal including the notification output from the output unit, wherein the acquisition unit also acquires information indicating that a running condition is changed due to the driving assistance, and the output unit outputs notification to the other vehicles before the running condition is changed, when the acquisition unit acquires the information indicating that the running condition is changed due to the driving assistance.]

[2. The notification device according to claim 1, farther comprising:

a determination unit that determines whether the running condition of the driver's vehicle approximates the running condition achieved by driving assistance, regardless of whether or not the acquisition unit acquires the information indicating that the driver's vehicle is receiving driving assistance, and when the determination unit identifies similarity, the output unit similarly outputs the information as it does when the acquisition unit acquires the information indicating that the driver's vehicle is receiving driving assistance.]

[3. A notification device mounted on a vehicle, comprising:

an acquisition unit that acquires information indicating that a driver's vehicle is receiving driving assistance in which the driver's vehicle is automatically driven;

an output unit that outputs notification to other vehicles in accordance with the information acquired by the acquisition unit; and a radio unit that transmits a packet signal including the notification output from the output unit, wherein the acquisition unit also acquires information indicating that a running condition is changed due to the driving assistance, and the output unit outputs notification to the other vehicles before the running condition is changed, when the acquisition unit acquires the information indicating that the running condition is changed due to the driving assistance.]

[4. The notification device according to claim 3, further comprising:

a determination unit that determines whether the running condition of the driver's vehicle approximates the running condition achieved by driving assistance, regardless of whether or not the acquisition unit acquires the information indicating that the driver's vehicle is receiving driving assistance, and when the determination unit identifies similarity, the output unit similarly outputs the information as it does when the acquisition unit acquires the information indicating that the driver's vehicle is receiving driving assistance.]

[5. A vehicle having a notification device mounted thereon, wherein the notification device includes:

an acquisition unit that acquires information indicating that a driver's vehicle is receiving driving assistance in which a speed is controlled to allow the driver's vehicle to pass a signal with a traffic light of the signal turned green;

an output unit that outputs notification to other vehicles in accordance with the information acquired by the acquisition unit; and a radio unit that transmits a packet signal including the notification output from the output unit, wherein the acquisition unit also acquires information indicating that a running condition is changed due to the driving assistance, and the output unit outputs notification to the other vehicles before the miming condition is changed, when the acquisition unit acquires the information indicating that the running condition is changed due to the driving assistance.]

[6. A vehicle having a notification device mounted thereon, wherein the notification device includes:

an acquisition unit that acquires information indicating that a driver's vehicle is receiving driving assistance in which the driver's vehicle is automatically driven;

an output unit that outputs notification to other vehicles in accordance with the information acquired by the acquisition unit; and a radio unit that transmits a packet signal including the notification output from the output unit, wherein the acquisition unit also acquires information indicating that a running condition is changed due to the driving assistance, and the output unit outputs notification to the other vehicles before the running condition is changed, when the acquisition unit acquires the information indicating that the running condition is changed due to the driving assistance.]

*7. A device for a first vehicle having a state indicator for externally displaying a status of the first vehicle, the device comprising:*

*a processor; and*

*a non-transitory memory storing a program which, when executed by the processor, causes the processor to:*

*receive a current position of the first vehicle from a GPS on the first vehicle;*

*calculate a driving route to a destination;*

*control the first vehicle in accordance with the calculated driving route when the first vehicle is in a*

*controlled-driving mode in which a speed and a traveling direction of the first vehicle are controlled by the processor;*

*acquire information indicating that the first vehicle is in the controlled-driving mode; and*

*in response to the acquired information, output an instruction for causing the state indicator outside the first vehicle to indicate information to notify a driver of a second vehicle other than the first vehicle that the first vehicle is in the controlled-driving mode.*

*8. The device according to claim 7, wherein the state indicator includes a tail lamp to be flashed in accordance with the instruction.*

*9. The device according to claim 7, wherein the state indicator includes a direction light to be flashed in accordance with the instruction.*

*10. The device according to claim 7, wherein the state indicator is different from a tail lamp and a direction light.*

*11. A method for a first vehicle having a state indicator for externally displaying a status of the first vehicle, the notification method comprising:*

*receiving a current position of the first vehicle from a GPS on the first vehicle;*

*calculating a driving route to a destination;*

*controlling the first vehicle in accordance with the calculated driving route when the first vehicle is in a controlled-driving mode in which a speed and a traveling direction of the first vehicle are controlled by the processor;*

*acquiring information indicating that the first vehicle is the automatic driving mode; and*

*in response to the acquired information, outputting an instruction for causing the state indicator outside the first vehicle to indicate information to notify a driver of a second vehicle other than the first vehicle that the first vehicle is in the controlled-driving mode.*

*12. The method according to claim 11, wherein the state indicator includes a tail lamp to be flashed in accordance with the instruction.*

*13. The method according to claim 11, wherein the state indicator includes a direction light to be flashed in accordance with the instruction.*

*14. The method according to claim 11, wherein the state indicator is different from a tail lamp and a direction light.*

* * * * *